United States Patent
Yu et al.

(10) Patent No.: US 10,027,225 B2
(45) Date of Patent: Jul. 17, 2018

(54) SWITCHED MODE POWER SUPPLY HAVING A STAIRCASE CURRENT LIMIT

(71) Applicant: QUALCOMM Incorporated, San Diego, CA (US)

(72) Inventors: Guolei Yu, Singapore (SG); Yicheng Wan, Singapore (SG); Chunlei Shi, San Diego, CA (US); Sugato Mukherjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/656,456

(22) Filed: Mar. 12, 2015

(65) Prior Publication Data
US 2016/0268896 A1    Sep. 15, 2016

(51) Int. Cl.
*H02M 3/156*    (2006.01)
*H02M 1/14*    (2006.01)
*H02M 1/00*    (2006.01)

(52) U.S. Cl.
CPC .............. *H02M 3/156* (2013.01); *H02M 1/14* (2013.01); *H02M 2001/0025* (2013.01); *H02M 2001/0032* (2013.01); *Y02B 70/16* (2013.01)

(58) Field of Classification Search
CPC . H02M 2001/0032; H02M 2001/0012; H02M 3/1566; H02M 3/156
See application file for complete search history.

(56) References Cited

U.S. PATENT DOCUMENTS

| | | | | |
|---|---|---|---|---|
| 5,666,044 A * | 9/1997 | Tuozzolo | ................ | G05F 1/573 323/273 |
| 6,977,492 B2 | 12/2005 | Sutardja et al. | | |
| 7,906,943 B2 * | 3/2011 | Isobe | .................... | H02M 3/156 323/223 |
| 8,199,539 B2 | 6/2012 | Wang et al. | | |
| 8,283,907 B1 | 10/2012 | Jayaraj | | |
| 8,811,037 B2 | 8/2014 | Marino | | |
| 2006/0028188 A1* | 2/2006 | Hartular | ................ | H02M 3/156 323/273 |
| 2007/0081799 A1* | 4/2007 | Endo | ...................... | B62D 5/046 388/811 |
| 2007/0164720 A1 | 7/2007 | Lalithambika et al. | | |
| 2008/0273354 A1 | 11/2008 | Ryu et al. | | |
| 2009/0040791 A1 | 2/2009 | Qahouq et al. | | |

(Continued)

FOREIGN PATENT DOCUMENTS

EP    3010131 A1    4/2016

OTHER PUBLICATIONS

Powerohm Resistors, Inc. "Motor Control Applications". Sep. 2010. pp. 1-4. Online. www.powerohm.com/pdfs/mcca700.pdf.*

(Continued)

*Primary Examiner* — Gary L Laxton
*Assistant Examiner* — Peter Novak
(74) *Attorney, Agent, or Firm* — Haynes and Boone, LLP IP Section

(57) ABSTRACT

Disclosed is switching power supply that includes a pulse frequency modulation (PFM) mode of operation current feedback control. A reference current source is configured to output a reference current at one of several selectable levels. The level of the reference current may vary during operation of the current feedback control loop.

19 Claims, 7 Drawing Sheets

(56) References Cited

U.S. PATENT DOCUMENTS

| | | | |
|---|---|---|---|
| 2009/0230930 A1* | 9/2009 | Jain | H02M 3/1588 |
| | | | 323/234 |
| 2012/0293146 A1 | 11/2012 | Zhao et al. | |
| 2013/0076128 A1 | 3/2013 | Nee | |
| 2013/0176004 A1 | 7/2013 | Lai et al. | |
| 2014/0252973 A1 | 9/2014 | Liu | |
| 2015/0024357 A1* | 1/2015 | Faubert | A61B 5/16 |
| | | | 434/236 |
| 2015/0062108 A1* | 3/2015 | Archibald | H02M 3/156 |
| | | | 345/212 |

OTHER PUBLICATIONS

Trescases et al "Digitally Controlled Current-Mode DC-DC Converter IC". IEEE Transactions on Circuits and Systems—I: Regular Papers, vol. 58, No. 1, Jan. 2011 pp. 219-231.*

Second Written Opinion from International Application No. PCT/US2016/019745 dated Feb. 2, 2017, 9 pgs.

International Search Report—PCT/US2016/019745—ISA/EPO—Jun. 7, 2016.

Written Opinion—PCT/US2016/019745—ISA/EPO—Jun. 7, 2016.

* cited by examiner

US 10,027,225 B2

SWITCHED MODE POWER SUPPLY HAVING A STAIRCASE CURRENT LIMIT

BACKGROUND

Unless otherwise indicated, the foregoing is not admitted to be prior art to the claims recited herein and should not be construed as such.

Switching power supplies, such as buck converters, boost converters, etc., may operation in pulse width modulation (PWM) mode. The output voltage can be regulated by varying the duty cycle or pulse width of a pulsed control signal. Switching efficiency, however, drops off at lower loads. Due to an increasing range of functionality provided in mobile computing devices (e.g., communication devices, computer tablets, etc.), low load conditions are becoming more common. Accordingly, switching using PWM mode only becomes increasingly less efficient.

Switching power supply designs may include a pulse frequency modulation (PFM) mode of operation, sometimes referred to as "power saving mode." Switching power supplies may operate in PFM mode to support certain functionality in a power management circuit when it is in a low power mode. In PFM mode, the frequency of the control pulses varies with load current and switching cycles are initiated only as needed to maintain the output voltage. The ability of the switching power supply to provide current in PFM mode is typically based on a preset PFM current limit value to improve efficiency under low load conditions. Increasing the current limit allows PFM mode to provide more power under low loads, but at the expense of increasing ripple artifacts in the output voltage.

SUMMARY

In some embodiments according to the present disclosure a switching regulator may include an output stage comprising switching FETs. The switching regulator may include circuitry configured to enable switching of the output stage in response to changes in an output voltage of the circuit relative to a reference voltage.

The switching regulator may further include switching circuitry to generate a control signal to drive the output stage in response to an output current of the output stage relative to the a reference current.

The switching regulator may further include a reference circuit configured to generate the reference current. The reference circuit may be configured to change a level of the reference current from a first level to a second level in response to changes in the output current of the output stage relative to the reference current.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1A:
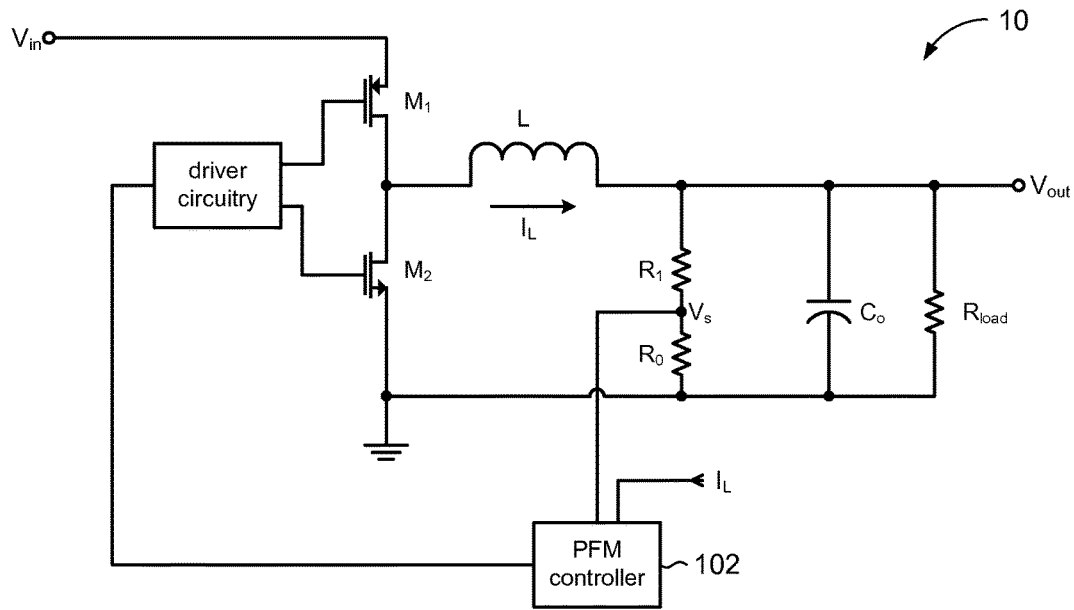
FIGS. 1A and 1B illustrate examples of switching regulators in accordance with the present disclosure.

A pulse frequency modulated (PFM) controller in accordance with the present disclosure may be incorporated in a switching regulator; e.g., a buck converter, boost converter, etc. FIG. 1A, for example, shows a buck converter 10 in accordance with the present disclosure. The buck converter 10 may include a PFM controller 102. In some embodiments, the PFM controller 102 may regulate the output voltage $V_{out}$ based on $V_{out}$ and a current $I_L$ across inductor L, and driving the power switches M1 and M2 accordingly. In other embodiments, the switch current (e.g., across M1 or M2) may be used for control purposes instead of inductor current. In some embodiments, the power switches M1, M2 may be power FETs, although M1 and M2 may be any suitable power switch technology.

Figure 1B:
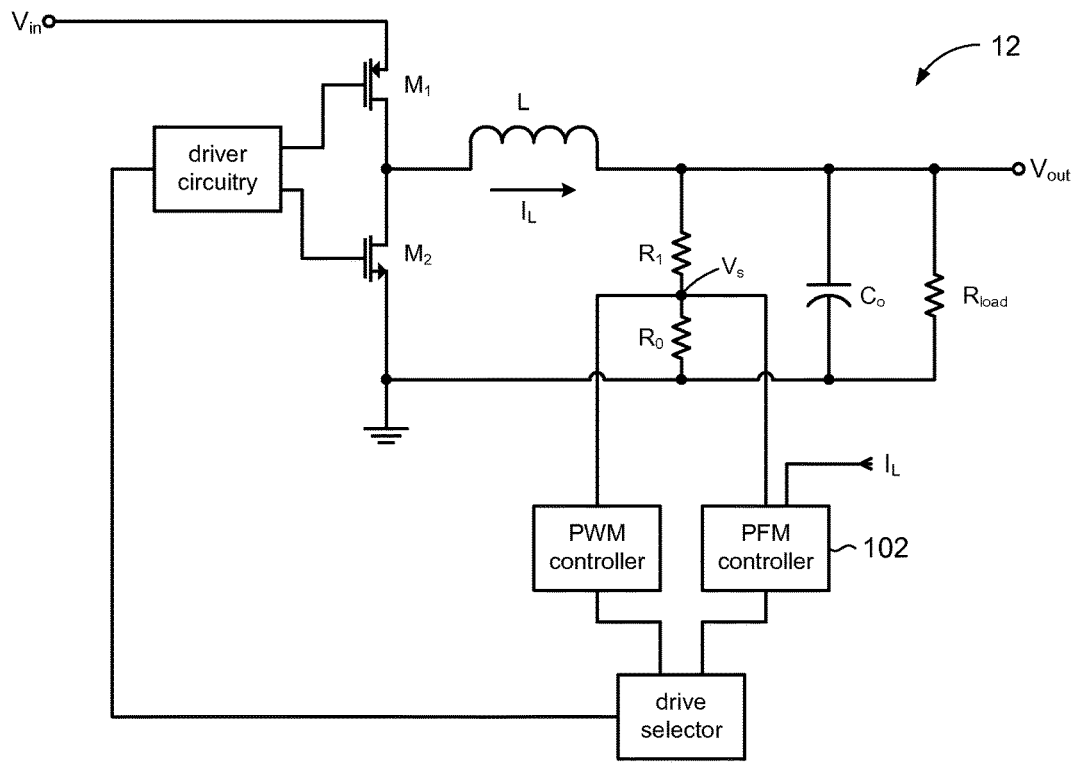

In some embodiments, a PFM controller in accordance with the present disclosure may operate in conjunction with a pulse width modulated (PWM) controller in a switching regulator. FIG. 1B, for example, shows a buck converter 12 comprising PFM controller 102 and a PWM controller. Outputs of the PWM controller and PFM controller 102 may be selectively provided by a drive selector to the driver circuitry to drive power switches M1, M2. In some embodiments, for example, the switching regulator may operate in PWM mode during certain load conditions, and then switch to PFM mode under lighter load conditions.

Figure 2:
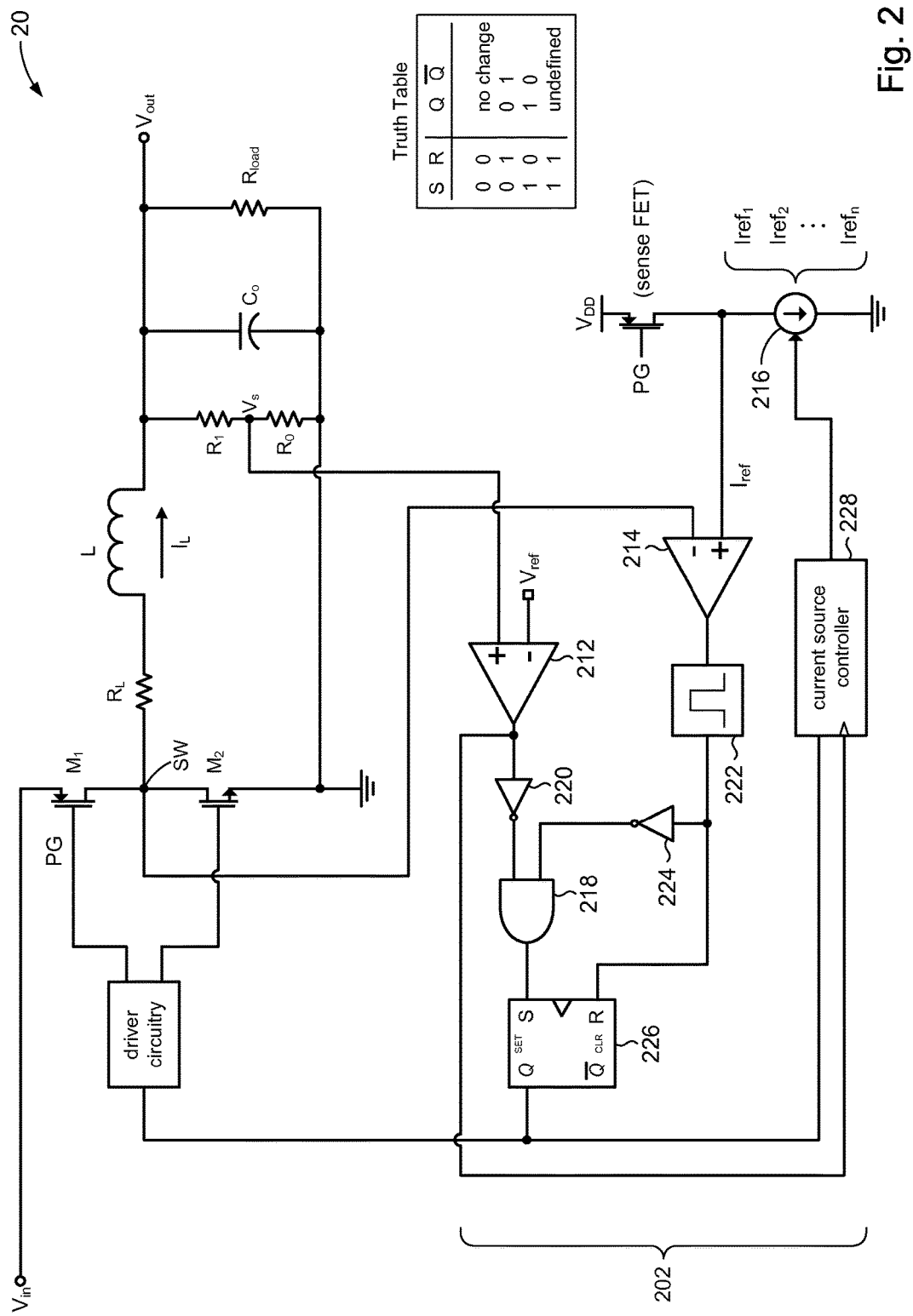
FIG. 2 illustrate a PFM controller in accordance with the present disclosure.

FIG. 2 illustrates circuitry comprising a PFM controller 202 in accordance with some embodiments of the present disclosure. Merely for illustrative purposes, a buck converter configuration will be used to explain the PFM controller 202. Persons of ordinary skill, however, will understand that the PFM controller 202 can be incorporated in any suitable switching regulator architecture.

Switches M1, M2 may constitute an output stage of the buck converter 20. In some embodiments, the switches M1, M2 may comprise power FET devices; e.g., MOSFETs. The gates of M1, M2 may be driven by driver circuitry. The driver circuitry may receive a signal that serves as a control signal to control the switching of M1 and M2.

The PFM controller 202 may monitor an output voltage $V_{out}$ of the buck converter 20. In some embodiments, for example, the PFM controller 202 may comprise a voltage comparator 212 having an input that receives $V_{out}$. In the buck converter 20 shown in FIG. 2, for example, a resistor divider network comprising resistors $R_1$, $R_0$ may be used to sense $V_{out}$, and provide a voltage $V_s$ that is representative of $V_{out}$ to the voltage comparator 212. The voltage comparator 212 may receive a reference voltage $V_{ref}$ and generate an output that switches between a first state and a second state (e.g., a square wave) when $V_s$ becomes greater than $V_{ref}$ and less than $V_{ref}$.

The PFM controller 202 may sense an output current of the output stage. In some embodiments, the PFM controller 202 may comprise a current comparator 214 having an input connected to a switching node SW of the output stage to receive a signal that is indicative of the output current of the output stage. It will be appreciated, of course, that the output current may be sensed in other ways depending on the particular configuration of the switching regulator. In the configuration shown in FIG. 2, for example, output current of the output stage may be sensed from the current $I_L$ across inductor L, for example using resistor $R_L$.

The PFM controller 202 may comprise a current reference 216 connected to the current comparator 214. The sense FET provides a scaled copy of the current in the main FET (e.g., M1). In a particular embodiment, for example, the sense FET provide a scaling factor of 1/20,000. The current comparator 214 may receive a reference current $I_{ref}$ from the current reference 216 and generate an output that switches between a first state and a second state (e.g., a square wave) as the output current becomes greater than $I_{ref}$ and less than $I_{ref}$.

The outputs of voltage comparator 212 and current comparator 214 may connect to an AND gate 218. In an embodiment, for example, the output of voltage comparator 212 may connect to AND gate 218 via an inverter 220. The output of current comparator 214 may connect to AND gate 218 via a monostable multivibrator (one-shot) 222 and inverter 224. In some embodiments, the positive boolean logic may be used, where TRUE is represented by a HI signal and FALSE is represented by a LO signal. In other embodiments, negative logic may be used. For purposes of the present disclosure, positive logic will be assumed.

The PFM controller 202 may comprise an S-R flip flop 226 that operates in accordance with the truth table shown in FIG. 2. The output of AND gate 218 may connect to the S input of the flip flop 226 and the output of the one-shot 222 may connect to the R input of the flip flop 226. An output Q of the flip flop 226 may serve as a control signal to the driver circuitry for switching M1 and M2. For example, Q HI may turn ON M1 and turn OFF M2, and vice versa Q LO may turn OFF M1 and turn ON M2.

The PFM controller 202 may comprise a current source controller 228, having an input connected to the output Q of the flip flop 226 to control operation of the current source controller 228. The current source controller 228 may include a reset input connected to the output of voltage comparator 212 to reset the current source controller 228 to an initial state. This aspect of the present disclosure will be explained in more detail.

Figure 2A:
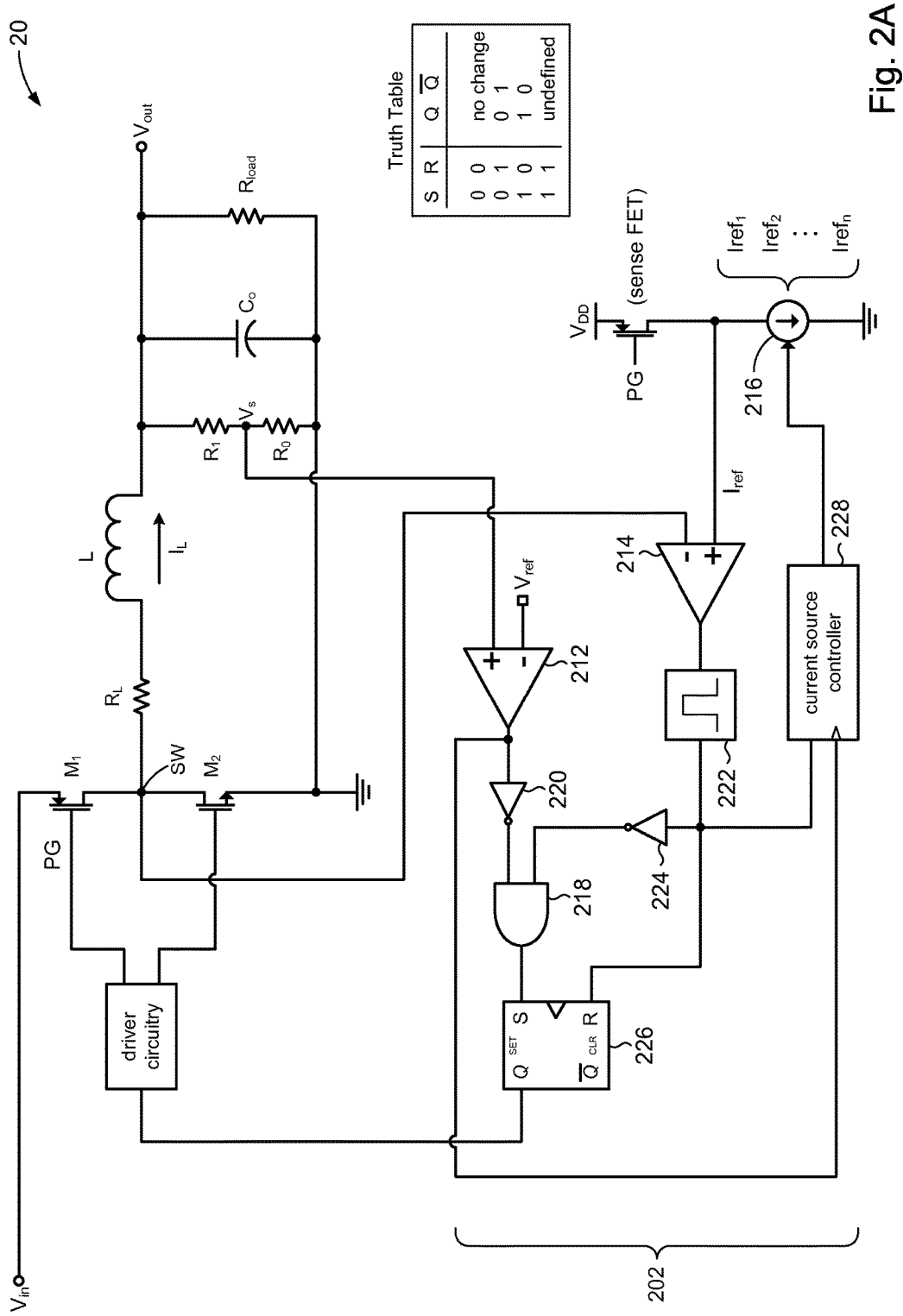
FIGS. 2A and 2B illustrate variations of the PFM controller shown in FIG. 2.
Figure 2B:
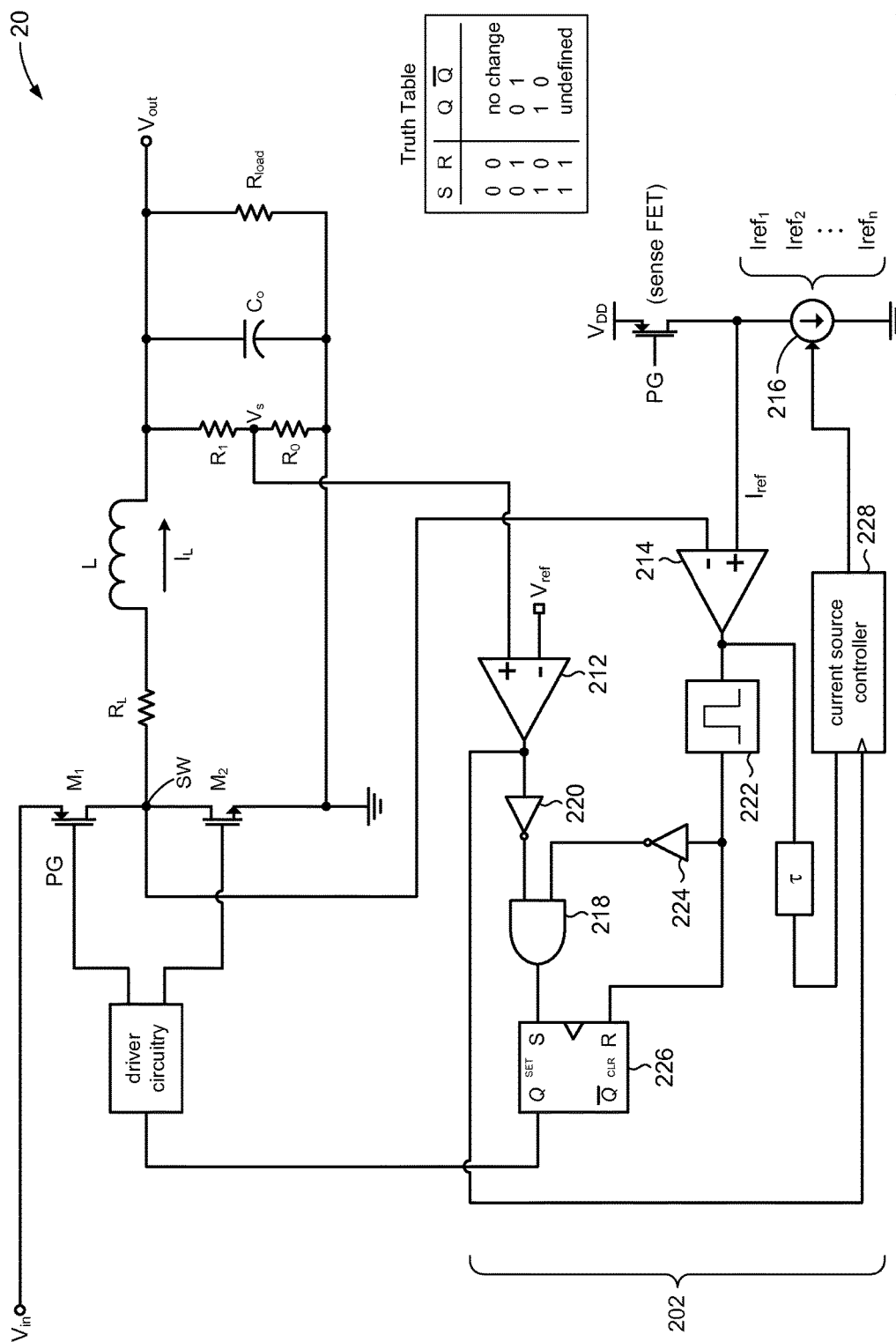

In accordance with the present disclosure, the current source 216 may comprise several selectable current levels: $Iref_1 < Iref_2 < Iref_3 < \ldots < Iref_n$. The current source controller 228 may connect to a control input of the current source 216 to select a level of the reference current $I_{ref}$ used by current comparator 214. As will be explained below, the input to the current source controller 228 can trigger a level change in the current source 216. In some embodiments, FIG. 2 for example, the trigger may come from the Q output of flip flop 226. In other embodiments, the trigger for a level change may come from the output of the one-shot 222 as illustrated in FIG. 2A, for example. The trigger for a level change may be based on the current comparator 214 as illustrated in FIG. 2B, and so on. This aspect of the present disclosure will be explained in more detail.

Figure 3:
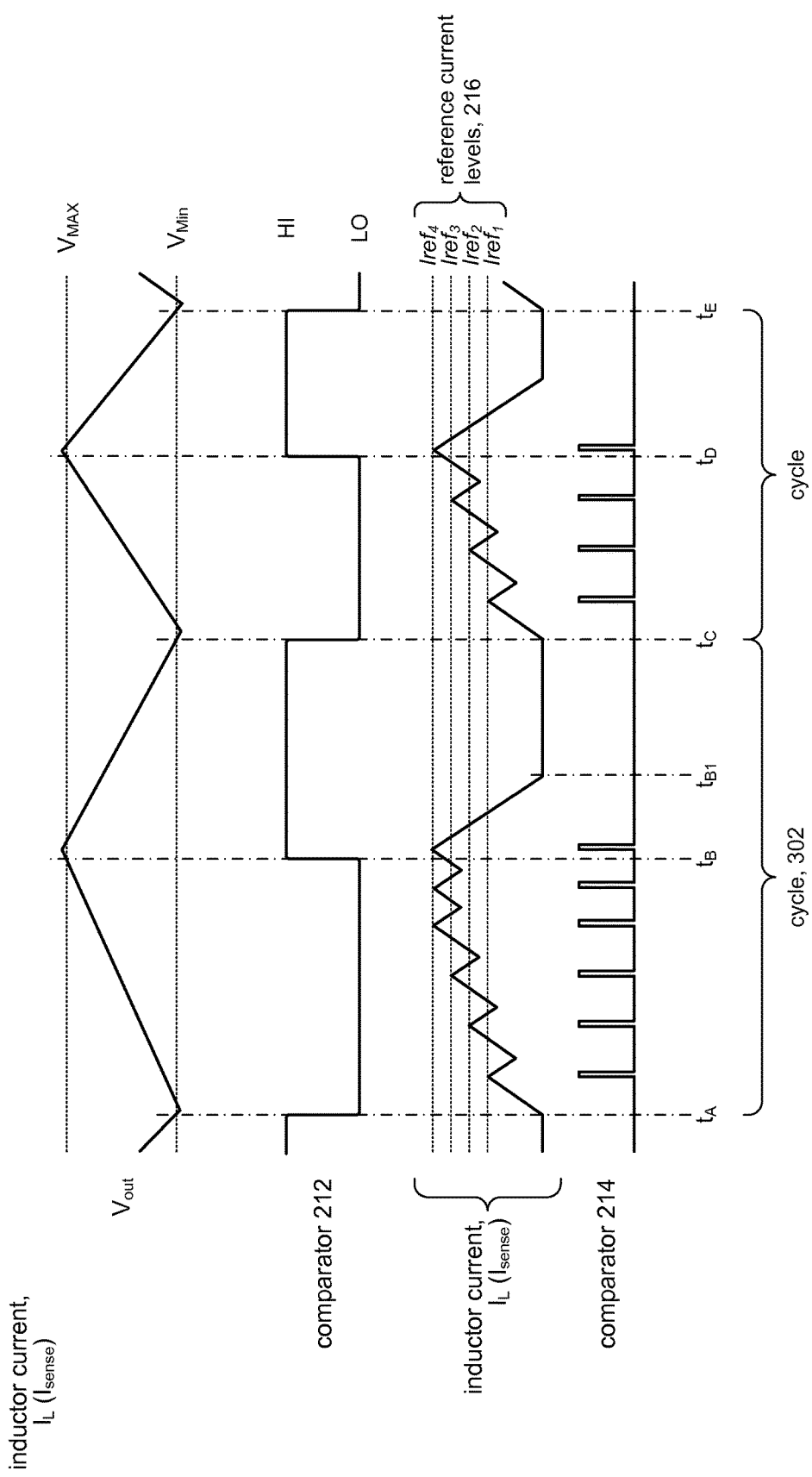
FIGS. 3 and 4 illustrate waveforms and timing diagrams of operation of the circuit shown in FIG. 2.

FIG. 3 is a high level illustration of operation of the PFM controller 202 shown in FIG. 2. The PFM controller 202 may operate to maintain the output voltage $V_{out}$ of buck converter 10 between $V_{max}$ and $V_{min}$. In some embodiments, $V_{max}$ and $V_{min}$ may be based on the hysteresis ($V_{hys}$) of voltage comparator 212. For example, $V_{min}$ and $V_{max}$ may be computed as follows: $V_{min} = s \times V_{ref}$ and $V_{max} = s \times (V_{ref} + V_{hys})$, where s is a scaling factor based the voltage divider circuit formed by $R_1$, $R_0$. In other embodiments, $V_{min}$ and $V_{max}$ may be computed as follows: $V_{min} = s \times (V_{ref} - 0.5V_{hys})$ and $V_{max} = s \times (V_{ref} + 0.5V_{hys})$. It will be appreciated, more generally, that $V_{min}$ and $V_{max}$ may be obtained in any suitable manner; e.g., using a reference other than voltage comparator 212, using separate references, and so on.

Referring to the waveforms and timing diagrams in FIG. 3, when the output voltage $V_{out}$ falls below $V_{min}$ at time $t_A$, the voltage comparator 212 transitions from HI to LO, which enables various circuitry to restore $V_{out}$ by switching M1 and M2. Switching of M1 and M2 begins at time $t_A$, where M1 is turned ON and M2 is turned OFF. Current begins to flow from $V_{in}$, across inductor L, to charge output capacitor $C_o$. Accordingly, the inductor current $I_L$ begins to increase. The reference current $I_{ref}$ serves to limit the current that flows across the inductor L. Accordingly, when inductor current $I_L$ exceeds the reference current $I_{ref}$, M1 may be switched OFF and M2 switched ON so that $I_L$ decays as output capacitor $C_o$ discharges through the load $R_{load}$. After some time has passed, M1 is again switched ON and M2 is switched OFF, and inductor current $I_L$ begins to increase and charges output capacitor $C_o$ until $I_L$ again exceeds $I_{ref}$. This repeats until the output voltage $V_{out}$ rises above $V_{max}$.

In accordance with the present disclosure, the current source 216 may be initially configured (e.g., at time $t_A$) to output a reference current $I_{ref}$ at a first current level (e.g., $Iref_1$). The inductor current $I_L$ exceeding the reference current $I_{ref}$ may serve as an event that triggers a change in the reference current $I_{ref}$ from one level to another level. FIG. 3, for example, shows that a change in level of the reference current $I_{ref}$ from $Iref_1$ to $Iref_2$ to $Iref_3$ to $Iref_4$ can be triggered in synchrony with the inductor current $I_L$ exceeding the reference current $I_{ref}$.

By gradually increasing the current limit from $Iref_1$ to $Iref_4$, the PFM controller 202 can reduce the amount of excess energy that is stored in the inductor each time that M1 turns OFF, which can reduce the amount of ripple in the output voltage $V_{out}$. This approach allows a switching regulator in accordance with the present disclosure (e.g., buck converter 10, FIG. 1) to deliver high current to a load in incremental fashion and reduce output ripple artifacts in the output voltage $V_{out}$.

When the output voltage $V_{out}$ reaches $V_{max}$ at time $t_B$, the voltage comparator 212 transitions from LO to HI. In response, M1 will turn OFF and M2 will turn ON, allowing the inductor current $I_L$ to decay to zero. In some embodiments, M1 may be turned OFF and M2 may be turned ON at a time subsequent to the voltage comparator 212 transitioning from LO to HI. In other embodiments, M1 may be turned OFF and M2 may be turned ON substantially at the time that voltage comparator 212 transitions from LO to HI. In some embodiments, switch M2 may additionally be turned OFF after the inductor becomes zero (e.g., at time $t_{B1}$). The period of time from $t_A$ to $t_C$ may be referred to as a cycle 302 of operation. The cycle may repeat when the output voltage $V_{out}$ again falls below $V_{min}$; e.g., at time $t_C$.

Figure 4:
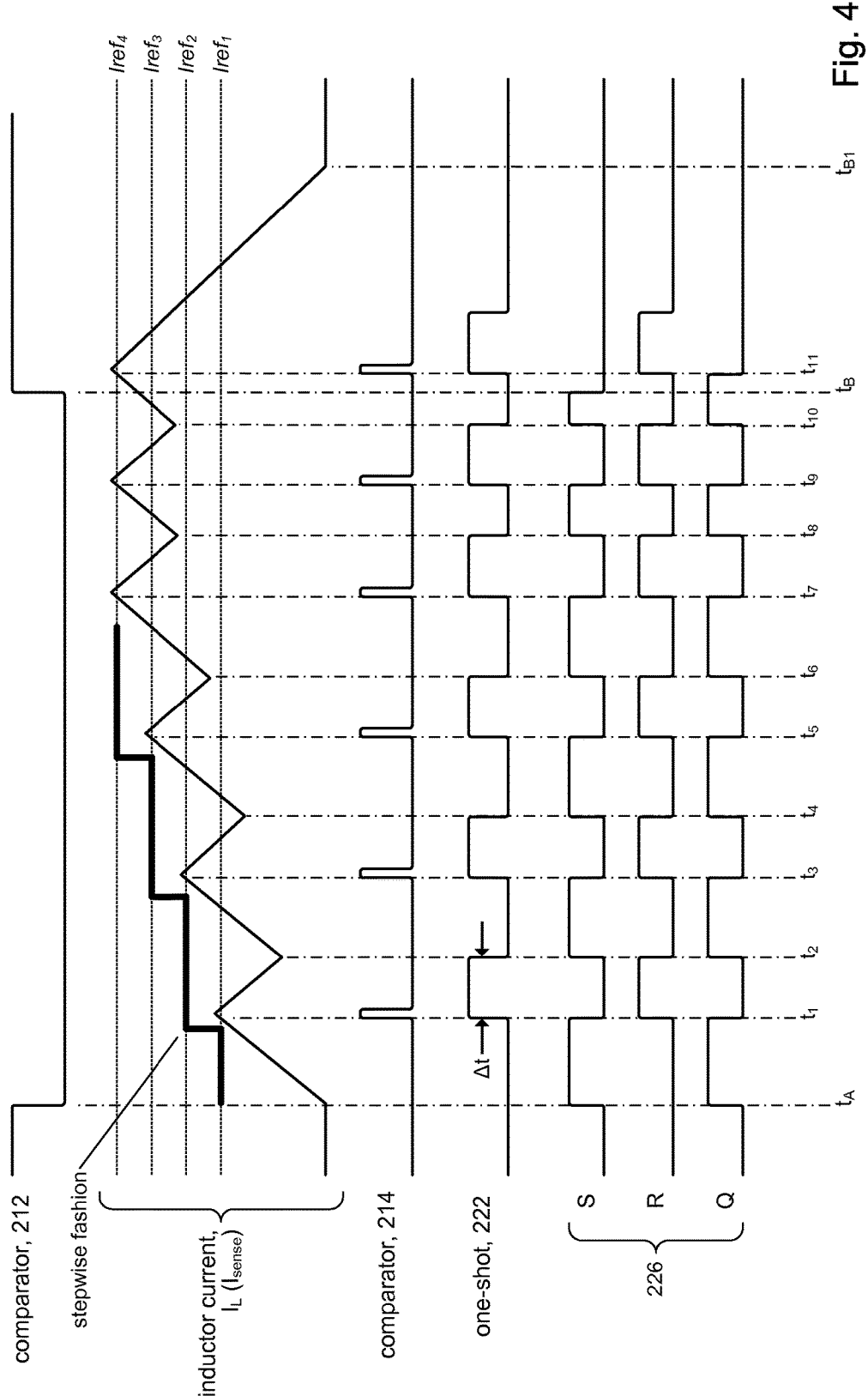

The waveforms and timing diagrams in FIG. 4 illustrate in more detail a cycle of operation, discussed in connection with circuitry shown in FIG. 2. When the output voltage $V_{out}$ falls below $V_{min}$ at time $t_A$, the voltage comparator 212 transitions from HI to LO. The transition to LO enables switching of M1 and M2, to restore $V_{out}$ to a level higher than $V_{min}$ and less than $V_{max}$. Thus at time $t_A$, the one-shot 222 is LO and so the inputs to flip flop 226, accordingly, are S=HI, R=LO. The output Q transitions from LO to HI, which can serve as a control signal to the driver circuitry to turn M1 from OFF to ON and maintain M2 OFF. Current begins to flow across inductor L to charge output capacitor $C_o$.

The current source controller 228 may set the reference current $I_{ref}$ from current source 216 to an initial level (e.g., $Iref_1$). In some embodiments, for example, the transition of voltage comparator 212 from HI to LO may serve as a trigger for the current source controller 228 to reset the reference current $I_{ref}$ to an initial level.

During the period of time from $t_A$ to $t_1$, inductor current $I_L$ increases until $I_L$ exceeds $Iref_1$ at time $t_1$. This event at time $t_1$ causes current comparator 214 to trigger, which in turn triggers the one-shot 222 to transition from LO to HI. The transition of the one-shot 222 from LO to HI resets the flip flop 226 (S=LO, R=HI), which sets Q to LO. In response to Q being LO, the driver circuitry turns OFF M1 and turns ON M2. This state of the output stage allows the inductor current $I_L$ to decay beginning from time $t_1$.

The one-shot 222 has a delay of $\Delta t$, and resets to LO after a period of time $\Delta t$ has passed. Accordingly, at time $t_2$ ($t_1+\Delta t$), the one-shot 222 resets to LO, which sets the flip flop 226 (S=HI, R=LO) and sets Q to HI. In response to Q being HI, the driver circuitry turns ON M1 and turns OFF M2, thus allowing current to once again flow across inductor L at time $t_2$. As known by those of ordinary skill, the delay $\Delta t$ may be defined by a capacitor for the one-shot 222. In some embodiments, the capacitor may have a fixed capacitance. In other embodiments, the capacitance may be selectable, allowing for $\Delta t$ to be varied.

In accordance with the present disclosure, the current source controller 228 may change the reference current $I_{ref}$ from a first level (e.g., $Iref_1$) to a second level (e.g., $Iref_2$). In some embodiments, the current source controller 228 may change the level of reference current $I_{ref}$ in response to transitions of the output Q of flip flop 226. Referring to FIG. 4, for example, the level of reference current $I_{ref}$ may change at some time after Q goes LO at time $t_1$, but before time $t_2$. Accordingly, when M1 turns ON at time $t_2$, the inductor current $I_L$ will be compared to reference current $I_{ref}$ at a new level (e.g., $Iref_2$).

In other embodiments, the current source controller 228 may change the level of the reference current $I_{ref}$ in response to triggers other than transitions of the output Q of flip flop 226. For example, in FIG. 2A, the current source controller 228 may use the output of the one-shot 222 as the trigger. In FIG. 2B, the current controller 228 may use the output of the current comparator 214 as the trigger. In FIG. 2B, a delay may be provided to delay the output of the current comparator 214 to the current source controller 228 so that the current comparator 214 uses the correct level of the reference current $I_{ref}$. In some embodiments, for example, the delay should be sufficient to allow enough time for the one-shot 222 to trigger.

Continuing with FIG. 4 at time $t_2$, the inductor current $I_L$ increases until the level of $I_L$ reaches $Iref_2$ at time $t_3$. The current comparator 214 triggers at time $t_3$ and in response, M1 turns OFF and M2 turns ON in the manner explained above. The current source controller 228 may control the current source 216 to produce reference current $I_{ref}$ at the next level (e.g., $Iref_3$) for the next round, at time $t_4$, when M1 is turned ON, and so on.

The switching of M1 and M2 continues in this manner, incrementally charging output capacitor $C_o$ until the voltage comparator 212 transitions from LO to HI at time $t_B$ when the output voltage $V_{out}$ reaches $V_{max}$. At time $t_B$, the S input of flip flop 226 goes LO in response to voltage comparator 212 transitioning from LO to HI. Since the R input to flip flop 226 is already LO (because the output of the one-shot 222 is LO), the output Q of flip flop 226 remains HI so M1 remains ON and M2 remains OFF. At time $t_{11}$, when the inductor current $I_L$ exceeds $Iref_4$, the current comparator 214 triggers and the one-shot 222 goes HI, which resets flip flop 226 and Q goes LO. In response, M1 turns OFF and M2 turns ON. From time $t_{11}$, the inductor current $I_L$ is allowed to decay until $I_L$ reaches zero at time $t_{B1}$. In some embodiments, M2 may be turned OFF at time $t_{B1}$. The cycle may repeat in response to the voltage comparator 212 transitioning from HI to LO when the output voltage $V_{out}$ falls below $V_{min}$.

As described above, in some embodiments of the present disclosure, the current source 216 may output a reference current $I_{ref}$ at any one of a number of selectable levels during regulation of the output voltage $V_{out}$. FIG. 4, for example, shows that the levels of reference current $I_{ref}$ in a cycle may vary in stepwise fashion, from $Iref_1$ (initial level) to $Iref_2$ to $Iref_3$ to $Iref_4$, and maxes out at $Iref_4$. The level may reset to $Iref_1$ in a subsequent cycle. In other embodiments, the current source 216 may be configured to provide a different number of selectable levels of the reference current $I_{ref}$. In some embodiments, a level change may occur with each triggering event (e.g., transition of Q from HI to LO) or after two or more triggering events. In other embodiments, the levels may continually increase to a maximum level, or may vary up and down from one level change to another. In other embodiments, the levels may vary in an arbitrary order, and so on.

Figure 5:
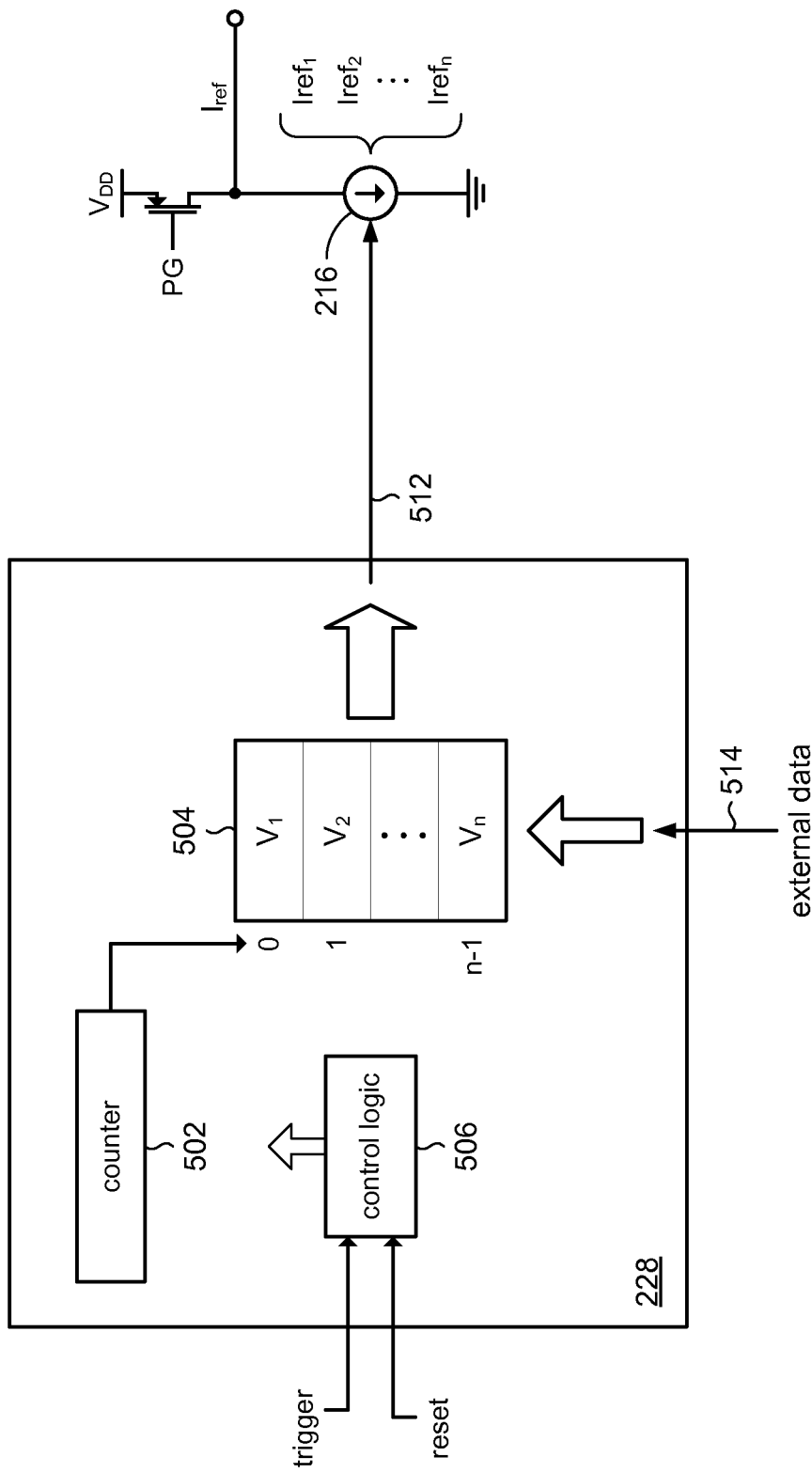
FIG. 5 illustrates an embodiment of a current source controller in accordance with the present disclosure.

In some embodiments, the current source controller 228 may use a lookup table to store a predetermined sequence of level changes. FIG. 5, for example, shows an example of a current source controller 228 in accordance with the present disclosure. The current source controller 228 may comprise a counter 502, a lookup table 504, and control logic 506. The control logic 506 may include a reset input to reset the state of the current source controller 228. For example, in some embodiments, the reset input may connect to the output of voltage comparator 212. The control logic 506 may include a trigger input to change the state of the current source controller 228 to a next state. In some embodiments, for example, the trigger input may be connected to the Q output of flip flop 226.

The lookup table 504 may store values $V_1$-$V_n$, and output a selected value from the lookup table 504 indexed by the counter 502. A signal corresponding to the selected output value may be presented on output line 512. The current source 216 may be configured to output the reference current $I_{ref}$ at a level corresponding to the selected output value of the lookup table 504.

The control logic 506 may respond to a HI to LO transition on the reset input to set the state of the current source controller 228 to an initial state. For example, the control logic 506 may initialize the counter 502 to output '0' so that the lookup table outputs a value $V_1$. The control logic 506 may respond to a LO to HI transition on the trigger input. In response, the control logic 506 may increment the counter 502, or decrement the counter 502, or do nothing. In some embodiments, for example, the control logic 506 may increment the counter 502 in response to each trigger. In other embodiments, the control logic 506 may increment or decrement the counter 502 depending on its current output. In other embodiments, the control logic 506 may increment or decrement the counter 502 depending on its previous action, and so on.

In some embodiments, the current source controller 228 may include an input 514 to receive data to be loaded into the lookup table 504. The data may specify a set of current levels, allowing the reference current $I_{ref}$ to be programmable with different current levels at different times.

In some embodiments, the lookup table 504 may be a decoder that can decode the input from counter 502 to produce a value that the current source 216 can use to generate the reference current $I_{ref}$.

Advantages and Technical Effect

Output ripple in the voltage output of a switching regulator (e.g., buck converter 10, FIG. 1) is largely determined by the excess energy stored in the inductor when the output voltage reaches the level being regulated and that excess energy is discharged. In accordance with the present disclosure, since the current limit in the regulator is initially lower, then at light loads, where the first few turn-on cycles could bring the output voltage to be higher than the regulated level, there is less energy stored in the inductor and thus less ripple effect. Maximum current can still be delivered, since the current limit incrementally increases to its maximum value.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A circuit comprising:
    a switching circuitry having a switching node, the switching circuitry configured to assert or deassert an input voltage on the switching node in response to a control signal;
    an output stage coupled to the switching node, the output stage having an output current;
    first circuitry configured to generate a first signal representative of changes in a voltage level of an output voltage of the circuit relative to a reference voltage and a second signal representative of changes in the output current relative to a reference current;
    second circuitry connected to the first circuitry and selectively operable as a function of the first signal and the second signal to provide the control signal to the switching circuitry to drive the output stage, the second circuitry configured to provide the control signal to the switching circuitry to drive the output stage according to the first signal and the second signal, the control signal being configured to limit the output current to a maximum value indicated by the reference current by deasserting the input voltage on the switching node when the second signal indicates that the output current exceeds the reference current; and
    a reference circuit coupled to the first circuitry and configured to generate the reference current, the reference circuit configured to change a level of the reference current from a first level to a second level in response to the output current reaching the reference current at the first level.

2. The circuit of claim 1, wherein the first level is greater than the second level.

3. The circuit of claim 1, wherein the first level is less than the second level.

4. The circuit of claim 1, wherein the reference circuit is configured to output the reference current at a level selected from a plurality of predefined levels in response to one or more transitions of the control signal between a first state and a second state.

5. The circuit of claim 1, wherein the reference circuit is configured to change the level of the reference current from one level to a next level in a predefined sequence of levels.

6. The circuit of claim 1, further comprising a memory having stored therein a plurality of values, wherein the reference circuit is configured to access the memory to read out a read out value, wherein the reference circuit is configured to produce the reference current at a level that corresponds to the read out value.

7. The circuit of claim 1, further comprising a decoder configured to output a decoder output value in response to a transition of the control signal between a first state and a second state, wherein the reference circuit is configured to produce the reference current at a level that corresponds to the decoder output value.

8. The circuit of claim 1, wherein the first circuitry comprises a comparator configured to compare a level of the reference voltage with the voltage level that is representative of the output voltage of the circuit.

9. The circuit of claim 1, wherein the second circuitry comprises a comparator configured to compare the reference current generated by the reference circuit with the output current.

10. The circuit of claim 1, wherein a switching circuitry comprises a first switching device coupled between the input voltage and the switching node and a second switching device coupled between the switching node and a ground.

11. The circuit of claim 10, wherein the output current of the output stage flows from the switching node.

12. A method for operating a circuit comprising:
    selectively enabling and disabling operation of switching circuitry to drive an output stage of the circuit, based on an output voltage of the circuit; and
    when operation of the switching circuitry is enabled, asserting and deasserting a drive signal to drive the output stage, including:
    (i) asserting the drive signal;
    (ii) deasserting the drive signal when an output current of the output stage exceeds a reference current;
    (iii) changing a level of the reference current from a first level to a second level when the output current of the output stage exceeds the reference current at the first level; and
    repeating (i) to (iii),
    wherein changing the level of the reference current includes:
    accessing a count value that counts a number of times the drive signal has been asserted and deasserted;
    using the count value to access an accessed level value from a memory having stored therein a plurality of level values; and setting the reference current to a level corresponding to the accessed level value.

13. The method of claim 12, further comprising changing the level of the reference current after the drive signal has been asserted and deasserted N number of times, where N is an integer ≥1.

14. The method of claim 12, wherein changing the level of the reference current includes incrementally increasing the level from a minimum level to a maximum level.

15. The method of claim 12, wherein the first level is different from the second level.

16. The method of claim 12, wherein the count value is reset to zero after it reaches a maximum count value.

17. The method of claim 12, wherein operation of the switching circuitry is enabled in response to the output voltage of the circuit falling below a first voltage level, wherein operation of the switching circuitry is disabled in response to the output voltage of the circuit rising above a second voltage level.

18. A circuit comprising:
an output stage;
means for selectively enabling and disabling operation of switching circuitry to drive the output stage, based on an output voltage of the circuit; and
means for asserting a drive signal to drive the output stage;
means for deasserting the drive signal when an output current of the output stage exceeds a reference current; and
means for generating the reference current, including changing a level of the reference current from a first level to a second level in response to the output current of the output stage exceeding the reference current.

19. The circuit of claim 18, wherein the means for generating the reference current is configured to produce the reference current at one of a plurality of selectable levels.

* * * * *